(12) United States Patent
Jarzombek

(10) Patent No.: US 6,493,944 B2
(45) Date of Patent: Dec. 17, 2002

(54) ROTATIVELY MOUNTED SELF-POWERED DEVICE FOR WEARING AND FOR USE BY RIGHT AND LEFT HANDED OPERATORS IN CUTTING FOLIAGE

(76) Inventor: Richard J. Jarzombek, 2143 Osborne Ave., Baiting Hollow, NY (US) 11933

( * ) Notice: Subject to any disclaimer, the term of this patent is extended or adjusted under 35 U.S.C. 154(b) by 0 days.

(21) Appl. No.: 09/791,380

(22) Filed: Feb. 23, 2001

(65) Prior Publication Data

US 2002/0116825 A1 Aug. 29, 2002

(51) Int. Cl.⁷ .............................................. A01D 34/00
(52) U.S. Cl. ...................... 30/275.4; 30/276; 30/296.1
(58) Field of Search ............................ 30/276, 275.4, 30/296.1; 173/30; 224/261–263

(56) References Cited

U.S. PATENT DOCUMENTS

| | | | | |
|---|---|---|---|---|
| 3,767,095 A | * | 10/1973 | Jones | 224/5 |
| 4,033,488 A | * | 7/1977 | Brewer | 224/5 |
| 4,099,657 A | * | 7/1978 | Zufich | 224/25 |
| 4,298,149 A | * | 11/1981 | Gottschalk et al. | 224/201 |
| 4,989,323 A | * | 2/1991 | Casper et al. | 30/296.1 |
| 5,004,135 A | * | 4/1991 | Dufournet et al. | 224/210 |
| 5,011,058 A | * | 4/1991 | Sapp et al. | 224/907 |
| 5,323,942 A | * | 6/1994 | Dahan | 224/215 |
| 6,047,668 A | * | 4/2000 | Yamamoto et al. | 123/2 |
| 6,053,259 A | * | 4/2000 | Kojima et al. | 173/30 |
| 6,122,830 A | | 9/2000 | Jarzombek | 30/276 |

* cited by examiner

Primary Examiner—Kenneth E. Peterson
Assistant Examiner—Omar Flores-Sánchez
(74) Attorney, Agent, or Firm—Richard L. Miller

(57) ABSTRACT

An improved self-powered device for wearing on the back and for use by right and left handed operators in cutting foliage of the type having a backpack portion, a gas engine attached to the backpack portion, and a foliage cutting portion operatively connected to the gas engine. The improvement includes the gas engine being swively attached to the backpack portion so as to allow the gas engine to rotate from one side to the other relative to the backpack portion for allowing use by the right and left handed operators and so as to allow the foliage cutting portion to move forwards and backwards relative to the backpack portion without the right and left handed operators having to move relative to the foliage which would be required if the gas engine was rigidly attached to the backpack portion.

4 Claims, 2 Drawing Sheets

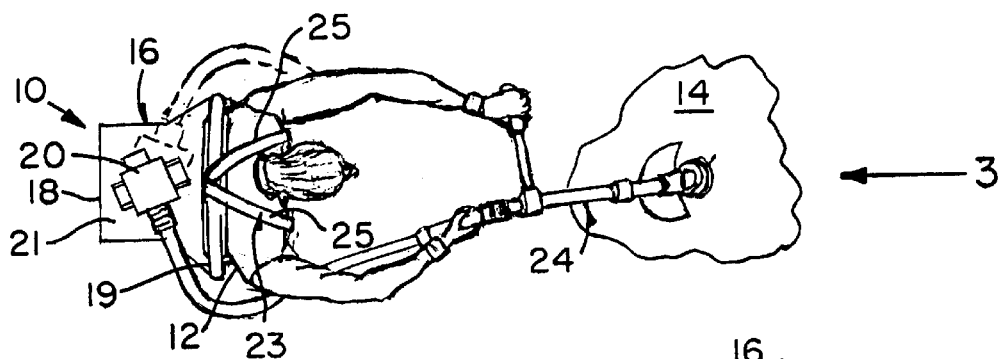
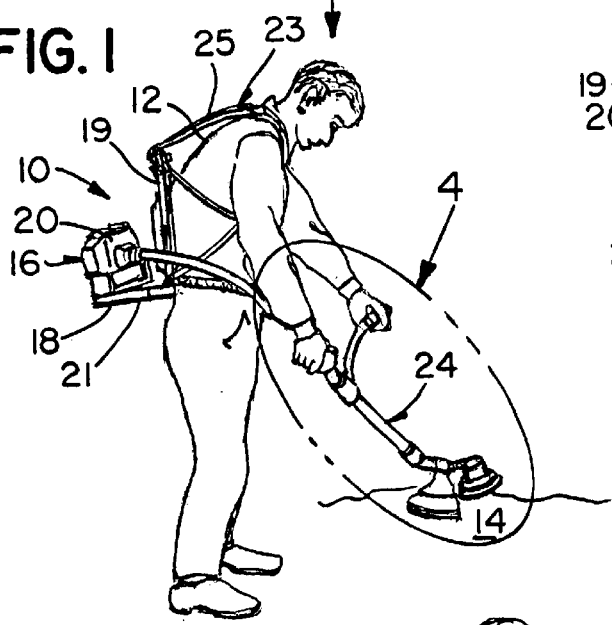
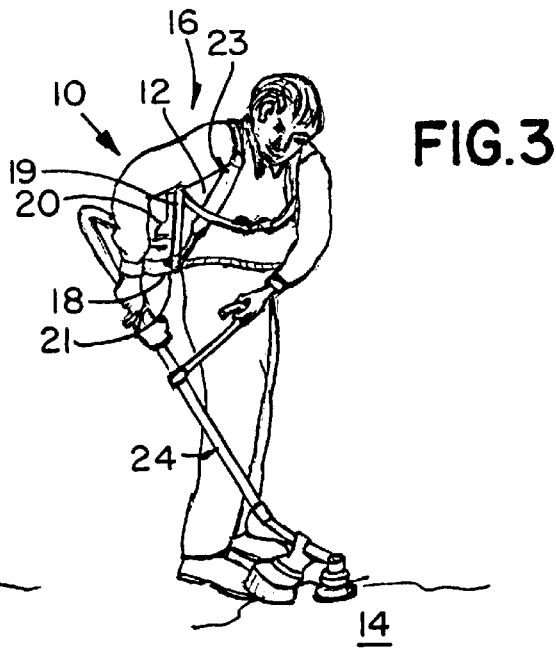
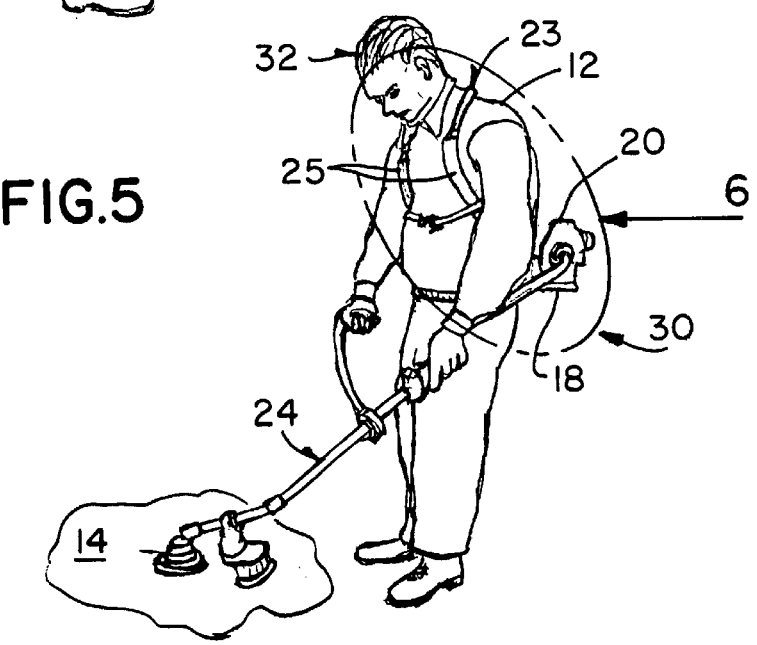

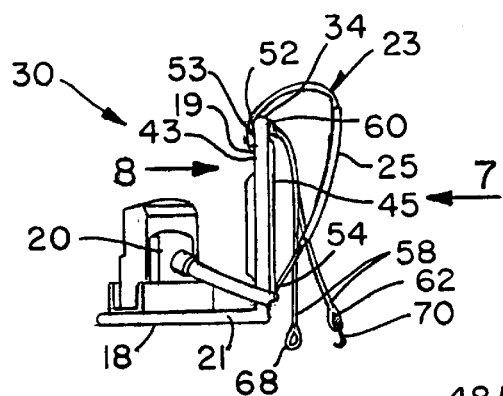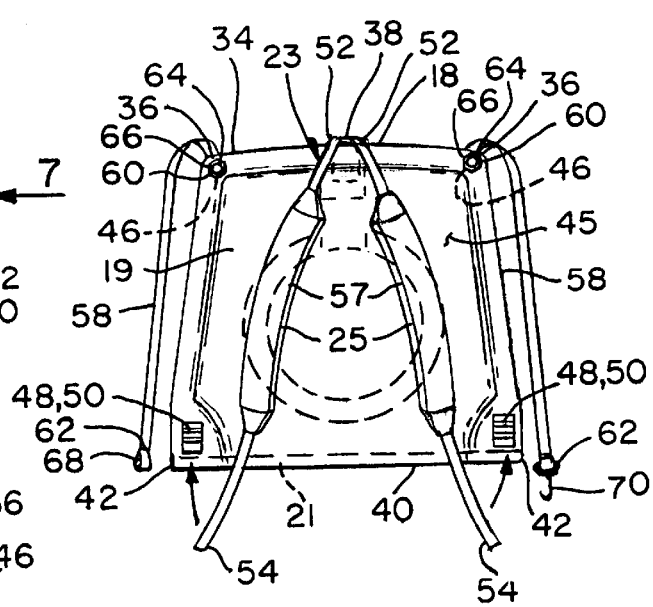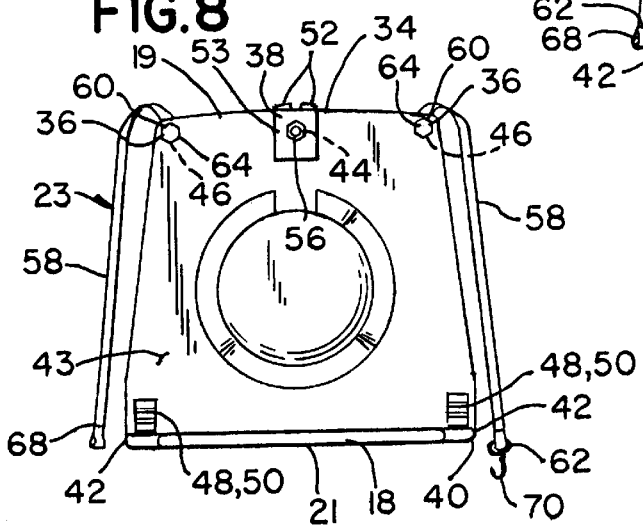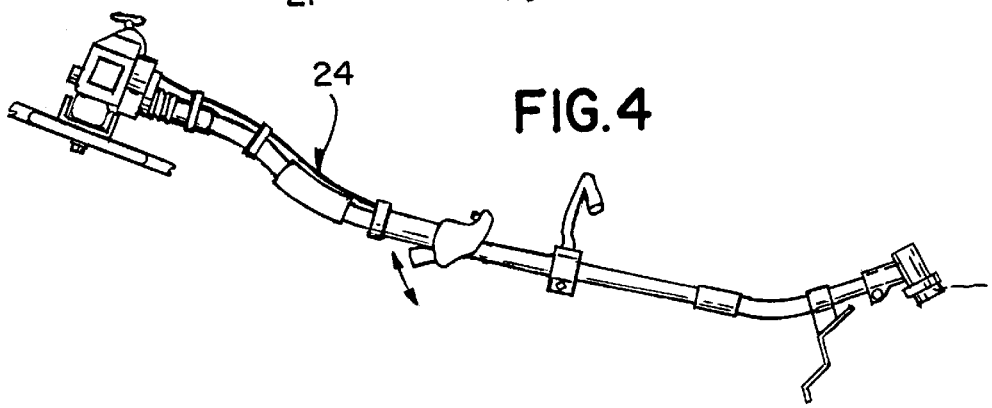

ROTATIVELY MOUNTED SELF-POWERED DEVICE FOR WEARING AND FOR USE BY RIGHT AND LEFT HANDED OPERATORS IN CUTTING FOLIAGE

BACKGROUND OF THE INVENTION

1. Field of the Invention

The present invention relates to a self-powered device for wearing on the back and for cutting foliage. More particularly, the present invention relates to an improved self-powered device for wearing on the back and for use by right and left handed operators in cutting foliage.

2. Description of the Prior Art

A prior art self-powered device 10 for wearing on the back 12 and for cutting foliage 14 is taught by my U.S. Pat. No. 6,122,830.

The general configuration of the prior art self-powered device 10 can best be seen in FIGS. 1–4, and as such, will be discussed with reference thereto.

The prior art self-powered device 10 has a backpack portion 16 with a frame 18 that has a vertical back-engaging portion 19 and a horizontal platform 21 extending rearwardly from the vertical back-engaging portion 19 thereof, a gas engine 20 attached to the horizontal platform 21 of the frame 18, a harness 23 attached to the frame 18 and having a pair of shoulder straps 25, and a foliage cutting portion 24 operatively connected to the gas engine 20.

SUMMARY OF THE INVENTION

ACCORDINGLY, AN OBJECT of the present invention is to provide an improved self-powered device for wearing on the back and for use by right and left handed operators in cutting foliage that avoids the disadvantages of the prior art.

ANOTHER OBJECT of the present invention is to provide an improved self-powered device for wearing on the back and for use by right and left handed operators in cutting foliage that is simple and inexpensive to manufacture.

STILL ANOTHER OBJECT of the present invention is to provide an improved self-powered device for wearing on the back and for use by right and left handed operators in cutting foliage that is simple to use.

BRIEFLY STATED, STILL YET ANOTHER OBJECT of the present invention is to provide an improved self-powered device for wearing on the back and for use by right and left handed operators in cutting foliage of the type having a backpack portion, a gas engine attached to the backpack portion, and a foliage cutting portion operatively connected to the gas engine. The improvement includes the gas engine being swively attached to the backpack portion so as to allow the gas engine to rotate from one side to the other relative to the backpack portion for allowing use by the right and left handed operators and so as to allow the foliage cutting portion to move forwards and backwards relative to the backpack portion without the right and left handed operators having to move relative to the foliage which would be required if the gas engine was rigidly attached to the backpack portion.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DESCRIPTION OF THE DRAWING

The figures of the drawing are briefly described as follows:

FIG. 1 is a diagrammatic side elevational view of a prior art device in use by a right handed operator;

FIG. 2 is a diagrammatic top plan view taken generally in the direction of arrow 2 in FIG. 1;

FIG. 3 is a diagrammatic front elevational view taken generally in the direction of arrow 3 in FIG. 2;

FIG. 4 is an enlarged diagrammatic side elevational view of the area generally enclosed by the dotted curve identified by arrow 4 in FIG. 1 of the foliage cutting portion of the prior art device shown in FIGS. 1–3;

FIG. 5 is a diagrammatic front elevational view of the present invention in use by a left handed operator;

FIG. 6 is an enlarged diagrammatic side elevational view of the area generally enclosed by the dotted curve identified by arrow 6 in FIG. 1 of the backpack portion of the present invention;

FIG. 7 is an enlarged diagrammatic rear elevational view taken generally in the direction of arrow 7 in FIG. 6; and FIG. 8 is an enlarged diagrammatic front elevational view taken generally in the direction of arrow 8 in FIG. 6.

LIST OF REFERENCE NUMERALS UTILIZED IN THE DRAWING

Prior Art 10 self-powered device for wearing on back 12
12 back
14 foliage
16 backpack portion
18 frame of backpack portion 16
19 vertical back-engaging portion of frame 18 of backpack portion 16
20 gas engine
21 horizontal platform of frame 18 of backpack portion 16
23 harness
24 foliage cutting portion
25 pair of shoulder straps of harness 23

Present Invention 30 improved self-powered device of present invention for wearing on back 12 and for use by right and left handed operators 32 in cutting foliage 14
32 right and left handed operators
34 uppermost edge of vertical back-engaging portion 19 of frame 18 of backpack portion 16
36 pair of terminal ends of uppermost edge 34 of vertical back-engaging portion 19 of frame 18 of backpack portion 16
38 midpoint of uppermost edge 34 of vertical back-engaging portion 19 of frame 18 of backpack portion 16
40 lowermost edge of vertical back-engaging portion 19 of frame 18 of backpack portion 16
42 pair of terminal ends of lowermost edge 40 of vertical back-engaging portion 19 of frame 18 of backpack portion 16
43 ambient-facing surface of vertical back-engaging portion 19 of frame 18 of backpack portion 16
44 upper shoulder strap-mounting blindbore extending in ambient-facing surface 43 of vertical back-engaging portion 19 of frame 18 of backpack portion 16
45 back-facing surface of vertical back-engaging portion 19 of frame 18 of backpack portion 16

46 pair of upper chest strap-mounting throughbores extending through pair of terminal ends 36 of uppermost edge 34 of vertical back-engaging portion 19 of frame 18 of backpack portion 16, respectively
48 two sets of lower chest strap-mounting throughslots
50 three throughslots of each set of two sets of lower chest strap-mounting throughslots 48 extending through pair of terminal end 42 of lowermost edge 40 of vertical back-engaging portion 19 of frame 18 of backpack portion 16, respectively
52 uppermost terminal end of each strap of pair of shoulder straps 25 of harness 23
53 upper mounting portion of pair of shoulder straps 25 of harness 23
54 lowermost terminal end of each strap of pair of shoulder straps 25 of harness 23
56 shoulder strap bolt
57 pair of pads
58 pair of chest straps of harness 23
60 innermost terminal end of each strap of pair of chest straps 58 of harness 23
62 outermost terminal end of each strap of pair of chest straps 58 of harness 23
64 pair of chest strap bolts
66 nut
68 loop formed by outermost end 62 of one chest strap of pair of chest straps 58
70 hook Description of the Preferred Embodiment Referring now to the figures, in which like numerals indicate like parts, and particularly to FIGS. 5–8, the improved self-powered device of the present invention is shown generally at 30 for wearing on the back 12 and for use by right and left handed operators 32 in cutting the foliage 14.

The improvement comprises the gas engine 20 being swively attached to the frame 18 so as to allow the gas engine 20 to rotate from one side to the other relative to the horizontal platform 21 of the frame 18 for allowing use by the right and left handed operators 32 and so as to allow the foliage cutting portion 24 to move forwards and backwards relative to the frame 18 without the right and left handed operators 32 having to move relative to the foliage 14 which would be required if the gas engine 20 was rigidly attached to the frame 18 causing the right and left handed operators 32, the frame 18, and the foliage cutting portion 24 to move as one unit relative to the foliage 14.

The improvement further comprises the vertical back-engaging portion 19 of the frame 18 having an uppermost edge 34 with a pair of terminal ends 36 and a midpoint 38 being midway between the pair of terminal ends 36 thereof, a lowermost edge 40 with a pair of terminal ends 42, an ambient-facing surface 43, and a back-facing surface 45.

The improvement further comprises an upper shoulder strap-mounting blindbore 44 extending in the ambient-facing surface 43 of the vertical back-engaging portion 19 of the frame 18 and being disposed at the midpoint 38 of the uppermost edge 34 of the vertical back-engaging portion 19 of the frame 18.

The improvement further comprises a pair of upper chest strap-mounting throughbores 46.

The improvement further comprises each upper chest strap-mounting throughbore 46 extending through an associated terminal end 36 of the uppermost edge 34 of the vertical back-engaging portion 19 of the frame 18.

The improvement further comprises two sets of lower chest strap-mounting throughslots 48.

The improvement further comprises each set of lower chest strap-mounting throughslots 48 comprising three throughslots 50 being horizontally-oriented, vertically spaced-apart from each other, and extending through an associated terminal end 42 of the lowermost edge 40 of the vertical back-engaging portion 19 of the frame 18.

The improvement further comprises the pair of shoulder straps 25 having uppermost terminal ends 52 converging into an upper mounting portion 53, and lowermost terminal ends 54.

The improvement further comprises a shoulder strap bolt 56 extending through the upper mounting portion 53 of the pair of shoulder straps 25, and into the upper shoulder strap-mounting blindbore 44, with the pair of shoulder straps 25 being mounted thereat and diverging dependingly therefrom over the back-facing surface 46 of the vertical back-engaging portion 19 of the frame 18.

The improvement further comprises the lowermost end 54 of each shoulder strap 25 tying length adjustably through the three throughslots 50 in an associated set of lower chest strap-mounting throughslots 48 so as to be releasably maintained thereat.

The improvement further comprises a pair of pads 57.

The improvement further comprises each pad 56 covering a shoulder-engaging portion of an associated shoulder strap 25.

The improvement further comprises the harness 23 further comprising a pair of chest straps 58 having innermost terminal ends 60 and outermost terminal ends 62.

The improvement further comprises a pair of chest strap bolts 64.

The improvement further comprises each chest strap bolt 64 extending through the innermost end 60 of an associated chest strap 58, through an associated upper chest strap-mounting throughbore 46, from the ambient-facing surface 43 of the vertical back-engaging portion 19 of the frame 18 the back-facing surface 45 of the vertical back-engaging portion 19 of frame 18, and engaging a nut 66.

The improvement further comprises the outermost end 62 of one chest strap 58 being formed into a loop 68 and the outermost end 62 of the other chest strap 58 having a hook 70 thereon selectively engaging the loop 68 of the one chest strap 58, an when engaging therewith, releasably maintaining the pair of chest straps 25 around the chest of the operator 32.

It will be understood that each of the elements described above, or two or more together, may also find a useful application in other types of constructions differing from the types described above.

While the invention has been illustrated and described as embodied in an improved self-powered device for wearing on the back and for use by right and left handed operators in cutting foliage, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An improved self-powered device for wearing on the back and for use by right and left handed operators in cutting foliage of the type having a backpack portion with a frame having a vertical back-engaging portion and a horizontal platform extending rearwardly from the vertical back-engaging portion thereof, a gas engine attached to the horizontal platform of the frame, a harness attached to the frame and having a pair of shoulder straps, and a foliage cutting portion operatively connected to the gas engine, said improvement comprising:

a) the gas engine being swively attached to the frame so as to allow the gas engine to rotate from one side to the other relative to the horizontal platform of the frame for allowing use by the right and left handed operators and so as to allow the foliage cutting portion to move forwards and backwards relative to the frame without the right and left handed operators having to move relative to the foliage which would be required if the gas engine was rigidly attached to the frame causing the right and left handed operators, the frame, and the foliage cutting portion to move as one unit relative to the foliage;

b) the vertical back-engaging portion of the frame having:
      i) an uppermost edge with:
         A) a pair of terminal ends; and
         B) a midpoint being midway between said pair of terminal ends thereof;
      ii) a lowermost edge with a pair of terminal ends;
      iii) an ambient-facing surface; and
      iv) a back-facing surface;

c) an upper shoulder strap-mounting blindbore extending in said ambient-facing surface of the vertical back-engaging portion of the frame and being disposed at said midpoint of said uppermost edge of the vertical back-engaging portion of the frame;

d) a pair of upper chest strap-mounting throughbores; each upper chest strap-mounting throughbore extending through an associated terminal end of said uppermost edge of the vertical back-engaging portion of the frame;

e) two sets of lower chest strap-mounting throughslots; each set of lower chest strap-mounting throughslots comprising three throughslots being horizontally-oriented, vertically spaced-apart from each other, and extending through an associated terminal end of said lowermost edge of the vertical back-engaging portion of the frame;

f) the pair of shoulder straps having:
      i) uppermost terminal ends converging into an upper mounting portion; and
      ii) lowermost terminal ends;

g) a shoulder strap bolt extending through said upper mounting portion of said pair of shoulder straps, and into said upper shoulder strap-mounting blindbore, with the pair of shoulder straps being mounted thereat and diverging dependingly therefrom over said back-facing surface of the vertical back-engaging portion of the frame;

h) the harness further comprising a pair of chest straps having:
      i) innermost terminal ends; and
      ii) outermost terminal ends;

i) a pair of chest strap bolts; each chest strap bolt extending through said innermost end of an associated chest strap, through an associated upper chest strap-mounting throughbore, from said ambient-facing surface of the vertical back-engaging portion of the frame to said back-facing surface of the vertical back-engaging portion of frame, and engaging a nut; and j) said outermost end of one chest strap being formed into a loop and said outermost end of the other chest strap having a hook thereon selectively engaging said loop of said one chest strap, and when engaging therewith, releasably maintaining said pair of chest straps around the chest of the operator.

2. The improved device as defined in claim 1, wherein said improvement further comprises said lowermost end of each shoulder strap tying length adjustably through said three throughslots in an associated set of lower chest strap-mounting throughslots so as to be releasably maintained thereat.

3. The improved device as defined in claim 1, wherein said improvement further comprises a pair of pads.

4. The improved device as defined in claim 3, wherein said improvement further comprises each pad covering a shoulder-engaging portion of an associated shoulder strap.

* * * * *